United States Patent
Izumi

(12) 
(10) Patent No.: US 6,577,641 B1
(45) Date of Patent: Jun. 10, 2003

(54) METHOD AND MEANS FOR ALLOCATING TIME SLOTS IN A TDD SYSTEM

(75) Inventor: Seiichi Izumi, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/281,097

(22) Filed: Mar. 29, 1999

(30) Foreign Application Priority Data

Mar. 31, 1998 (EP) .............................. 98105892

(51) Int. Cl.⁷ .............................................. H04B 7/212
(52) U.S. Cl. ...................... 370/442; 370/348; 370/347
(58) Field of Search ................................. 370/280, 294, 370/336, 337, 345, 347, 458, 348, 442, 443, 468; 455/450, 451, 452, 455

(56) References Cited

U.S. PATENT DOCUMENTS

| | | | | |
|---|---|---|---|---|
| 4,513,416 A | * | 4/1985 | Fujiwara ..................... | 370/324 |
| 5,117,423 A | * | 5/1992 | Shepherd et al. ........... | 370/280 |
| 5,200,956 A | * | 4/1993 | Pudney et al. .............. | 370/280 |
| 5,629,940 A | * | 5/1997 | Gaskill ....................... | 340/7.35 |
| 5,710,762 A | * | 1/1998 | Petranovich ................ | 370/280 |
| 5,719,859 A | * | 2/1998 | Kobayashi et al. ......... | 370/347 |
| 5,809,015 A | * | 9/1998 | Elliott et al. ................ | 370/280 |
| 5,930,246 A | * | 7/1999 | Akutsu ........................ | 370/337 |
| 6,016,311 A | * | 1/2000 | Gilbert et al. .............. | 370/280 |
| 6,061,340 A | * | 5/2000 | Albrow et al. .............. | 370/337 |
| 6,240,076 B1 | * | 5/2001 | Kanerva et al. ............ | 370/330 |
| 6,240,079 B1 | * | 5/2001 | Hamalainen et al. ....... | 370/337 |

FOREIGN PATENT DOCUMENTS

| | | | |
|---|---|---|---|
| GB | 2 332 595 A | * | 6/1999 |
| WO | WO 95/12258 | | 5/1995 |
| WO | WO 96/19086 | * | 6/1996 |

OTHER PUBLICATIONS

Patent Abstracts of Japan, vol. 097, No. 002, Feb. 28, 1997 & JP 08 279798 A (Toshiba Corp), Oct. 22, 1996.

Lan Chen et al: "A dynamic channel assignment algorithm for asymmetric traffic in voice/data integrated TDMA/TDD mobile radio" Proceedings of ICICS, 1997 International Conference on Information, Communications and Signal Processing, Theme: Trends in Information Systems Engineering and Wireless Multimedia Communications (Cat. No. 97TH8237), Proceedings of 1st International Con, pp. 215–219 vol. 1, XP002076254 ISBN 0–7804–3676–3, 1997, New York, NY USA, IEEE, USA.

* cited by examiner

Primary Examiner—Charles N. Appiah
(74) Attorney, Agent, or Firm—Frommer Lawrence & Haug LLP; William S. Frommer; Glenn F. Savit

(57) ABSTRACT

Method and apparatus for allocating tie slots in a time division duplex communication system. First and second types of time slots selected from receiving and transmitting type time slots are allocated as the first and second time slots, respectively, in a current frame. Based on an amount of information to be transferred, it is determined whether at least one time slot following the second time slot of the frame should be allocated as the first type of time slot, and if so, the last time slot of the frame is always allocated as the first type of time slot, whereby the last time slot of the frame and the first time slot of a succeeding frame are of the same type. If an additional time slot(s) is allocated for the second type of time slot, the third slot is always designated for the second type.

14 Claims, 1 Drawing Sheet

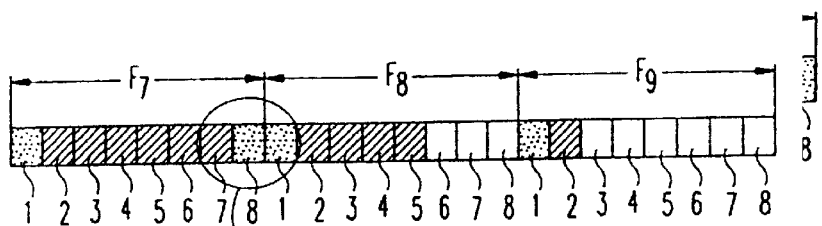
Fig. 1
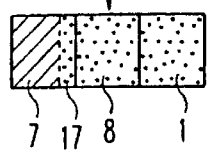
Fig. 4
Fig. 2
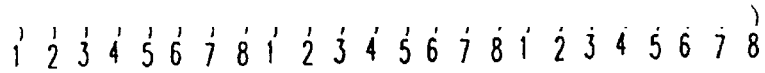
Fig. 3
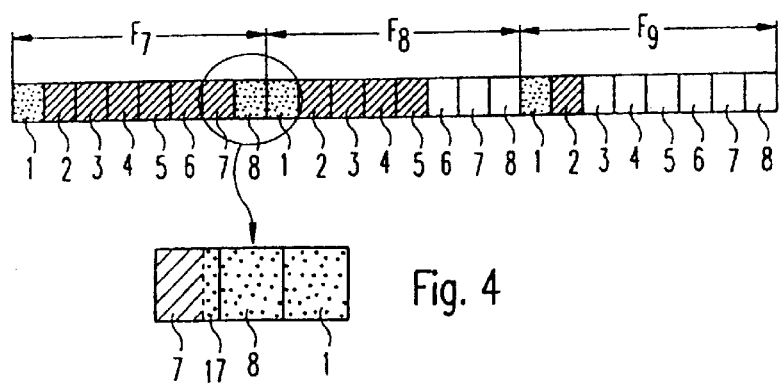
Fig. 4
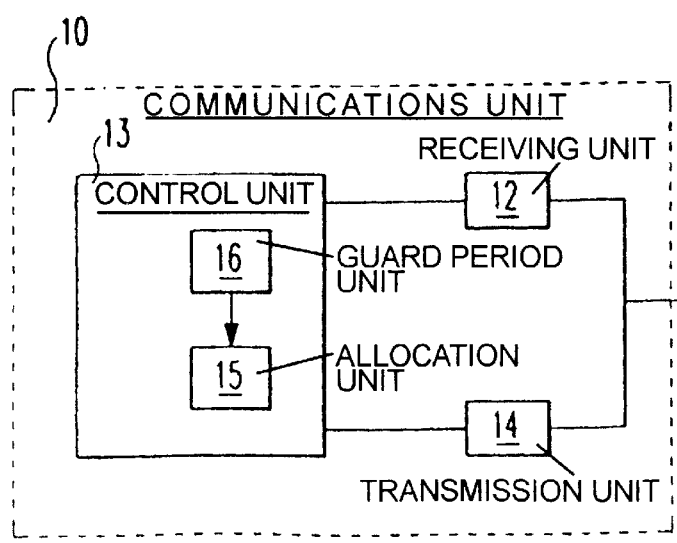
Fig. 5

METHOD AND MEANS FOR ALLOCATING TIME SLOTS IN A TDD SYSTEM

BACKGROUND OF THE INVENTION

1. Field of the Invention

The present invention relates to a method and a means for allocating time slots in a time division duplex communication system. Particularly, the method and the means for allocating time slots according to the present invention can be implemented in communication units of a time division duplex communication system, e.g. a base station and/or a mobile station of a telecommunication system.

2. Description of Related Art

In a time division duplex communication system, examples of which are the GSM-standard for outdoor mobile communication or the DECT-standard for indoor mobile telephone communication, the receiving and the transmitting channels are separated on a time basis. E.g. in the DECT-standard, the information is transmitted in time frames of a length of 10 ms having 24 time slots. The first 12 time slots are used for the downlink connection, that is the transmission of data from a base station to a mobile station. The last 12 time slots are used for the uplink connection, that is for the transmission of data from a mobile station to the base station. In the GSM-standard, a combination of a frequency division duplex and a time division duplex is used. The information is transmitted in time frames having 8 time slots, whereby the uplink connection is provided in a lower frequency band and the downlink connection is provided in a higher frequency band. Each of the 8 time slots in each frame is assigned to a different mobile station. Thereby, the time slots assigned to a certain mobile station within a downlink time frame are separated from the time slots assigned to the same mobile station in the uplink time frame by two time slots. In other words, if e.g. the first time slot in a downlink time frame is assigned to a certain mobile station, the fourth time slot in an uplink time frame is assigned to the same mobile station. The time basis separation of the uplink and downlink time slots enables the construction of the mobile stations to be made more simple, since the reception and the transmission of data does not take place simultaneously.

Since in telecommunication systems as e.g. the GSM-system the data transfer rate is restricted, attempts have been made to increase the data transfer rate by allocating more than one time slot per frame to a certain mobile station. In JP 05153033-A such a TD digital mobile telecommunication system is disclosed, in which the same frequency for transmitting and receiving information is used. 1 to N time slots within one uplink time frame are allocated to one mobile station and 1 to N time slots within one downlink time frame are allocated to one mobile station depending on the information volume to be transferred between the mobile station and a base station. Each frame is allocated either to the uplink transfer of data or the downlink transfer of data. The uplink time frames cannot be used for a downlink transfer of data, so that a strong asymmetric transmission of information with a large difference between the amount of uplink data and the amount of downlink data is not possible.

In JP 07107546-A, a TDMA radio communication system is disclosed, in which the ratio between the number of uplink and downlink time slots within one time frame or one super frame consisting of several time frames is changed according to the total amount of traffic between a base station and mobile stations. In case of fast changing data transfer amounts, the switching point within each frame between the uplink time slots and the downlink time slots often changes position. Every change of such a switching point requires a reallocation of several time slots for the different connected mobile stations. This known system therefore requires a complicated circuitry.

SUMMARY OF THE INVENTION

The slot allocation method disclosed in EP 654916-A2 suffers from the same problems.

The object of the present invention is therefore to provide a method and means for allocating time slots in a time division duplex communication system, which allow a simple and efficient time slot allocation for varying transfer information amounts.

This object is achieved by a method for allocating time slots according to claim 1 and a means for allocating time slots according to claim 8. Advantageous features of the present invention are defined in the respective subclaims.

The present invention relates to a method for allocating time slots in a time division duplex communication system, in which the information is transmitted in predetermined time frames having a predetermined number of time slots. In a GSM-system, the number of time slots per time frame is 8. Each time frame comprises a fixed block of one receiving time slot and one transmitting time slot being adjacent to each other. For the case where the method according to the present invention is implemented in a communication unit as e.g. a mobile station, the receiving time slot is a downlink time slot and the transmitting time slot is an uplink time slot. The method for allocating time slots according to the present invention comprises the step of allocating at least the time slot adjacent to the receiving time slot as additional receiving time slot and at least the time slot adjacent to the transmitting time slot as additional transmitting time slot dependent on an amount of information to be transferred. Thus, starting from the fixed block consisting of the receiving and the transmitting time slot, the time slots for receiving and transmitting are extended, whereby additional receiving time slots are added on the side of the receiving time slot of the fixed block and additional transmitting time slots are added on the side of the transmitting time, slot of the fixed block. Thereby, the additional time slots can be added or additionally allocated crossing the border of two adjacent time frames. In other words, the additional time slots can be extended from one time frame into an adjacent time frame.

Thus, even if a big difference between the uplink data amount and the downlink data amount occurs, the method and the means according to the present invention provides an efficient and simple possibility to transfer the information to be transferred asymetrically. Since the position of the switching point between the receiving time slot and the transmitting time slot is fixed due to the fixed block position, the method according to the present invention allows a transfer data amount change of a certain mobile station without the need of a reallocation of time slots for other mobile stations. Thus, the present invention is particularly advantageous in a multiple access communication system, in which one time frame is assigned to several communication units, e.g. several mobile stations.

Advantageously, the number of additional receiving time slots and the number of additional transmitting time slots are independent from each other. This means, that data or information can be transferred asymmetrically between two communication units. The receiving and the transmitting time slot of the fixed block can be allocated to a common first communication unit, e.g. a mobile station, whereby the transmitting time slot precedes or is earlier than the receiving time slot. In other words, the transmitting time slot is positioned in front of the receiving time slot on the time axis, so that problems in view of the timing advance can be provided. The timing advance means, that the base station has to receive an uplink time slot at a correct timing. To meet this requirement, the transmission timing of the uplink time slot is adjusted e.g. by a mobile station taking the propagation delay into consideration. Of course, the propagation delay is more important in outdoor environments, in which communication units as e.g. mobile stations are sometimes moved with high speed or in which multipath effects occur. The adjustment of the transmission timing of the uplink time slot is called timing advance. Here, the method of the present invention is implemented in a mobile station and if the transmitting time slot is earlier than the receiving time slot, the transmission timing of the uplink time slot transmitted from the mobile station to the station is not necessary, since the timing advance does not play a role in this case.

The additional time slots can either be allocated to the same first communication unit as the fixed block, or, in case of a multiple access communication system, one time frame is assigned to several communication units and the additional time slots are allocated to communication units different from said first communication unit. Even in a multiple access communication system, the present invention provides an advantageous possibility for an asymetric data transfer.

The above-mentioned timing advance only becomes important, if all the time slots of a time frame are used for data transfer. Even in case that the transmitting time slot is preceding the receiving time slot, in one position of the time frame another switching point between a transmitting time slot and a receiving time slot occurs. In this switching point, a receiving time slot is preceding a transmitting time slot, so that, e.g. in a mobile station, the timing advance leads to a possible overlap of the earlier receiving time slot into the later transmitting time slot. In this case, a guard period can be provided in at least one of the adjacent time slots. In other words, a guard period can be provided either in the earlier receiving time slot or in the later transmitting time slot to avoid problems due to the timing advance. Advantageously, the guard period is only provided at the end of the receiving time slot.

According to claim 8, a means for allocating time slots in a time division duplex communication system is provided, in which the information is transmitted in predetermined time frames having a predetermined number of time slots. Each time frame comprises a fixed block of one receiving time slot and one transmitting time slot being adjacent to each other. Said means for allocating time slots allocates at least the time slot adjacent to the receiving time slot as additional receiving time slot and at least the time slot adjacent to the transmitting time slot as additional transmitting time slot dependent on an amount of information to be transferred. Said means for allocating time slots according to the present invention can e.g. be implemented in a communication unit of a telecommunication system, as a mobile station and/or a base station. All statements above made in reference to the method for allocating time slots according to the present invention are identically true for the means for allocating time slots according to the present invention.

BRIEF DESCRIPTION OF THE DRAWINGS

In the following description, preferred embodiments of the present invention are explained relating to the accompanying drawings, in which FIG. 1 shows an example of a fixed block comprising one receiving time slot and one transmitting time slot being located at the beginning of respective time frames, FIG. 2.shows some time frames with additional transmitting time slots and additional receiving time slots, FIG. 3 shows some other time frames, wherein one of the time frames is saturated with data to be transmitted or received, so that an additional switching point is present.

FIG. 4 shows an enlarged section of FIG. 3 showing a timing advance of an additional transmitting time slot adjacent to a preceding receiving time slot, and FIG. 5 shows a schematic example of a communication unit comprising a means for allocating time slots according to the present invention.

DETAILED DESCRIPTION OF THE DRAWINGS

In FIG. 1, three time frames $F_1$, $F_2$ and $F_3$ are schematically shown. Each frame contains e.g. eight time slots, as in a GSM-system. Although all time frames shown in FIG. 1, 2 and 3 comprise eight time slots, the present invention is not limited to this case and the time frames can comprise any other required number of time slots. In each frame, the first two time slots 1 and 2 build a fixed block comprising a transmitting time slot 1 and a receiving time slot 2. In case that the present invention is implemented e.g. in a mobile station of a telecommunication system, the transmitting time slot is an uplink time slot for transmitting data or information from the mobile station to a base station, and the receiving time slot 2 is a downlink time slot for transmitting data from the base station to the mobile station. The transmitting time slot 1 and the receiving time slot 2 are thus assigned to a certain pair of communication units, e.g. a base station and a mobile station. The base station can thereby be part of the multiple access communication system, in which one frame is assigned to several mobile stations. The fixed block comprising the transmitting time slot 1 and the receiving time slot 2, however, is always on a fixed position.

In the first and second frame $F_1$ and $F_2$ shown in FIG. 1, the six remaining time slots 3 to 8 in each frame are not used for transferring information. Since the transmitting time slot 1 is placed in advance of the receiving time slot 2, this slot allocation can cope with timing advance as explained above. For a base station, the timing advance is adjusted by adjusting the timing of the time slots transmitted from the base station to the mobile station.

In the example shown in FIG. 1, the first frame $F_1$, the next frame $F_2$ and the third frame $F_3$ are not saturated since only the transmitting time slot 1 and the transmitting time slot 2 of the fixed block are used to transfer information in each of the frames. The last time slot 8 of the third frame $F_3$ is an additional transmitting time slot of the fixed block of the fourth frame $F_4$ of FIG. 4.

In FIG. 2, information are transmitted in the transmitting time slot 1 and the receiving time slot 2 forming a fixed block in each of the shown frames $F_4$, $F_5$ and $F_6$, as in the first example shown in FIG. 1. However, since there is more information to send and to receive, an additional transmitting time slot 8 is added before the time slot 1 of the fixed block in the time axis direction. Additional receiving time slots 3 and 4 are added behind the receiving time slot 2 in the time axis direction. Thus, an increased amount of information or data can be transferred between a mobile station and a base station or between several mobile stations and one base station. In the later case, the additional transmitting and/or receiving time slots can be allocated to different mobile stations. For example in the fifth time frame $F_5$, the additional receiving time slots 3, 4, 5 can be allocated to one or more different mobile stations. The position of the basic block, however, remains unchanged, so that the switching point between transmitting and receiving information, which is located between the first time slot 1 and the second time slot 2 in each frame, remains on the same position. This switching point is the only switching point, since the time frames are not saturated with information to be transferred. As can be seen from FIG. 2, according to the present invention, the number of additional transmitting time slots and additional receiving time slots can be increased independently, so that an asymetric transmission of data is possible. In case of a multiple access communication system, in which one time frame is assigned to several mobile stations, the additional time slots can be allocated to one or more different mobile stations. For a certain mobile station, the time slots to be transmitted or received may not come in a regular interval. However, the pattern of the slot allocation is maintained and continued over at least several frames, e.g. two frames $F_1$ and $F_2$ as shown in FIG. 1. In FIG. 2, the slot allocation pattern changes for the succeeding frames $F_4$, $F_5$ and $F_6$. The pattern of the slot allocation is advantageously not changed frame by frame, but is changed only, when the required data amount to be transferred is changed. This is the case for the time frame shown in FIG. 2, in which the data amount to be transferred is reduced to one transmitting time slot from frame $F_4$ to frame $F_5$ and the receiving time slot 2 from frame $F_5$ to frame $F_6$.

In case of a multiple access communication system, in which different time slots are assigned to different mobile stations, the time slots 3 and 4 being used as additional receiving time slots and the time slot 8 being used as additional transmitting time slot in the time frame $F_4$ can be assigned to a second mobile station, when the transmitting time slot 1 and the receiving time slot 2 of the fixed block are assigned to a first mobile station. The time slots 3 and 4 can also be allocated to a second mobile station and a third mobile station, respectively.

In case that the amount of information to be transferred is further increased, the maximum information transfer rate can be achieved by using all the time slots in each time frame for transferring data, as shown in FIG. 3 for the time frame $F_7$. In the shown example, the transmitting time slot 1 and the receiving time slot 2 are still on their fixed position at the beginning of each time frame. The time slots 3 to 7 of the frame $F_7$ are used as additional receiving time slots. Thereby, the different time slots 3 to 7 can be assigned or allocated to different mobile stations. An additional transmitting time slot 8 is also used in the time frame $F_7$, so that the last additional receiving time slot 7 and the succeeding additional transmitting time slot 8 are adjacent to each other. If in this situation the base station is located close to the mobile station, so that the propagation delay is small, there is no serious problem. If, however, the base station is located far from the mobile station, e.g. a few kilometer, the mobile station has to transmit the transmitting time slot 8 in advance to compensate for the propagation delay. In other words, a timing advance is necessary. Therefore, the mobile station has less time to receive the last additional receiving time slot 7. This situation is shown in more detail in FIG. 4. FIG. 4 shows a section of FIG. 3 with the last additional receiving time slot 7 and the additional transmitting time slot 8 of the preceding frame $F_7$ as well as the transmitting time slot 1 of the succeeding time frame $F_8$. As can be seen from FIG. 4, the last portion of the receiving time slot 7 is emptied and used as a guard period to enable an earlier transmission of the additional transmitting time slot 8. It has to be understood, that the timing advance problem only occurs, when a receiving time slot and a succeeding transmitting time slot are adjacent to each other, which are assigned to the same mobile station. It is therefore advantageous, not to allocate successive transmitting and receiving time slots to one mobile station in this case.

In time frame $F_8$ following time frame $F_7$ with the maximum information transfer, the amount of information to be transferred is reduced and only the time slots 3, 4 and 5 are allocated as additional receiving time slots. In the following time frame $F_9$, the amount of information to be transferred is further reduced to the basic block comprising the transmitting time slot 1 and the receiving time slot 2.

In FIG. 5, a communication unit 10, in which the present invention is incorporated or implemented, is schematically shown. The communication unit 10 can e.g. be a mobile station or a base station of a mobile telecommunication system.

The communication unit 10 comprises an antenna 11, through which information modulated onto respective carrier frequencies can be transmitted and received. The communication unit 10 comprises a receiving means 12, which receives incoming information through the antenna 11 and supplies the received information to a control unit 13, in which the received information are demodulated, decoded, etc. in a known manner. The control unit 13 comprises an allocation means 15, in which the time slots of the predetermined time frames are allocated depending on the amount of information to be transferred as receiving or transmitting time slots according to the method explained above. The control unit 13 can thus also comprise a means for determining the amount of information to be transferred, i.e. received or transmitted to give corresponding information to the allocation means 15, so that the allocation means 15 correspondingly allocates the time slots as receiving or transmitting time slots depending on the amount of transfer information. The allocation means 15 of the control unit 13 allocates the time slots according to the slot allocation method explained above in relation to FIGS. 1 to 4. Thereafter, the control unit 13 provides a transmission means 14 with corresponding information to be transmitted within the correspondingly allocated time slots by means of the antenna 11 to another communication unit. The control unit 13 can further comprise a guard period means 16, which, in case that an additional receiving time slot and an additional transmitting time slot become adjacent to each other, e.g. in the case shown in FIGS. 3 and 4, provides a guard period in at least one of said adjacent additional time slots. As stated above, this situation becomes only relevant in the case that the preceding receiving time slot and the succeeding transmitting time slot are assigned to the same communication unit 10. In this case it is advantageous, if the guard period means 16 provides said guard period at the end of said additional receiving time slots, e.g. the additional receiving time slot 7 of time frame $F_7$ shown in FIG. 3 and 4.

What is claimed is:

1. Method of allocating time slots in a time division duplex communication system, in which information is transmitted and received in predetermined time frames each having a predetermined number of time slots, wherein first and second types of time slots selected from receiving and transmitting type time slots are allocated, the first time slot of each frame is allocated as the first type of time slot, and the second time slot of each frame is allocated as the second type of time slot, said method comprising:

determining, based on an amount of information to be transferred, whether at least one time slot following the second time slot of a current frame should be allocated as the first type of time slot, and if so, always allocating the last time slot of the current frame as the first type of time slot, whereby the last time slot of the current frame and the first time slot of a succeeding frame are the same type of time slots; and allocating time slots following the second time slot of the current frame as additional receiving or transmitting time slots dependent on an amount of information to be transmitted and/or received, wherein if additional time slot(s) are allocated for the second type of time slot, always allocating at least the third time slot of the current frame as an additional second type time slot.

2. The method according to claim 1, wherein the number of additional receiving time slots and the number of additional transmitting time slots are independent from one another.

3. The method according to claim 1, wherein the first and second time slots of the current frame are receiving and transmitting time slots, respectively, and each is allocated to a first communication unit.

4. The method according to claim 3, wherein additional slots are also allocated to the first communication unit.

5. The method according to claim 3, wherein one of time frames ($F_1, F_2, \ldots$) is assigned to several communication units and the additional time slots are allocated to communication units different from said first communication unit.

6. The method according to claims 1, wherein when both the last time slot and next to last time slot of the current frame are each allocated for transmitting or receiving, a guard period is provided in at least one of said last and next to last time slots.

7. The method according to claim 6, wherein said next to last time slot of the current frame is the second type of time slot, said last time slot is the first type of time slot, and said guard period is provided at the end of said next to last time slot.

8. Apparatus for allocating time slots in a time division duplex communication system, in which information is transmitted and received in predetermined time frames each having a predetermined number of time slots, wherein first and second types of time slots selected from receiving and transmitting type time slots are allocated, the first time slot of each frame is allocated as the first type of time slot, and the second time slot of each frame is allocated as the second type of time slot, said apparatus comprising:

determining means for determining, based on an amount of information to be transferred, whether at least one time slot following the second time slot of a current frame should be allocated as the first type of time slot, and if so, always allocating the last time slot of the current frame as the first type of time slot, whereby the last time slot of the current frame and the first time slot of a succeeding frame are the same type of time slots; and allocating means for allocating time slots following the second time slot of the current frame as additional receiving or transmitting time slots dependent on an amount of information to be transmitted and/or received, wherein if additional time slot(s) are allocated for the second type of time slot, always allocating at least the third time slot of the current frame as an additional second type time slot.

9. Apparatus according to claim 8, wherein the number of additional receiving time slots and the number of additional transmitting time slots are independent from one another.

10. Apparatus according to claim 8, wherein the first and second time slots of the current frame are receiving and transmitting time slots, respectively, and each is allocated to a first communication unit.

11. Apparatus according to claim 10, wherein additional slots are also allocated to the first communication unit.

12. Apparatus according to claim 10, wherein one of time frames ($F_1, F_2, \ldots$) is assigned to several communication units and the additional time slots are allocated to communication units different from said first communication unit.

13. Apparatus according to claim 8, wherein when both the last time slot and next to last time slot of the current frame are each allocated for transmitting or receiving, a guard period is provided in at least one of said last and next to last time slots.

14. Apparatus according to claim 13, wherein said next to last time slot of the current frame is the second type of time slot, said last time slot is the first type of time slot, and said guard period is provided at the end of said next to last time slot.

* * * * *